United States Patent
Lundy et al.

(10) Patent No.: US 12,139,107 B2
(45) Date of Patent: Nov. 12, 2024

(54) ADJUSTABLE AIR SCOOP FOR LENS CLEANING

(71) Applicant: GENTEX CORPORATION, Zeeland, MI (US)

(72) Inventors: Eric S. Lundy, Holland, MI (US); Michael G. Hendricks, Hamilton, MI (US)

(73) Assignee: GENTEX CORPORATION, Zeeland, MI (US)

( * ) Notice: Subject to any disclaimer, the term of this patent is extended or adjusted under 35 U.S.C. 154(b) by 211 days.

(21) Appl. No.: 17/382,623

(22) Filed: Jul. 22, 2021

(65) Prior Publication Data

US 2022/0024421 A1    Jan. 27, 2022

Related U.S. Application Data

(60) Provisional application No. 63/054,812, filed on Jul. 22, 2020.

(51) Int. Cl.

| | | |
|---|---|---|
| *B60S 1/56* | (2006.01) | |
| *B08B 5/02* | (2006.01) | |
| *B08B 13/00* | (2006.01) | |
| *G02B 27/00* | (2006.01) | |
| *B60S 1/54* | (2006.01) | |

(52) U.S. Cl.
CPC ....... *B60S 1/56* (2013.01); *B08B 5/02* (2013.01); *B08B 13/00* (2013.01); *G02B 27/0006* (2013.01); *B60S 1/54* (2013.01)

(58) Field of Classification Search
CPC ..... B60S 1/56; B60S 1/54; B08B 5/02; B08B 13/00; G02B 27/0006
See application file for complete search history.

(56) References Cited

U.S. PATENT DOCUMENTS

| | | |
|---|---|---|
| 9,126,546 B2 | 9/2015 | Bochenek |
| 2009/0250533 A1 | 10/2009 | Akiyama et al. |

(Continued)

FOREIGN PATENT DOCUMENTS

| | | |
|---|---|---|
| CN | 207345672 U | 5/2018 |
| DE | 102011011412 A1 | 8/2012 |

(Continued)

OTHER PUBLICATIONS

International Preliminary Report on Patentability dated Jan. 24, 2023, for corresponding PCT application No. PCT/US2021/042716, 6 pages.

(Continued)

*Primary Examiner* — Alexander Markoff
(74) *Attorney, Agent, or Firm* — Price Heneveld LLP; Brian James Brewer

(57) ABSTRACT

A system comprises an imager having a lens; a housing supporting the imager and defining an inlet opening; a moveable vent cover configured to move between a first position and a second position; and a channel defined by a portion of the housing, the moveable vent cover, and a diverter, the channel configured to selectively direct an incoming fluid from the inlet opening defined by the moveable vent cover in the open position and the housing toward the lens. The system may further comprise a lens cover supported by the housing; the lens cover disposed to at least partially cover the lens.

11 Claims, 3 Drawing Sheets

(56) References Cited

U.S. PATENT DOCUMENTS

| | | | |
|---|---|---|---|
| 2012/0070142 A1* | 3/2012 | Tregnago | B60R 11/04 396/419 |
| 2012/0162428 A1* | 6/2012 | Wee | B60S 1/56 348/148 |
| 2013/0094086 A1* | 4/2013 | Bochenek | B62D 35/007 359/509 |
| 2015/0307065 A1 | 10/2015 | Kim et al. | |
| 2018/0001837 A1* | 1/2018 | Trebouet | B60S 1/528 |
| 2018/0091714 A1 | 3/2018 | Hendricks | |
| 2018/0178259 A1* | 6/2018 | Gillies | B08B 5/02 |
| 2019/0310470 A1* | 10/2019 | Weindorf | B60S 1/56 |
| 2021/0031732 A1* | 2/2021 | Alkharabsheh | G02B 1/18 |
| 2022/0024422 A1* | 1/2022 | Okamura | G03B 17/08 |
| 2022/0212634 A1* | 7/2022 | Ito | B60R 11/04 |

FOREIGN PATENT DOCUMENTS

| | | |
|---|---|---|
| EP | 2431231 A1 | 3/2012 |
| JP | 2009248661 A | 10/2009 |

OTHER PUBLICATIONS

International Search Report dated Oct. 28, 2021, for corresponding PCT application No. PCT/US2021/042716, 3 pages.
Written Opinion dated Oct. 28, 2021, for corresponding PCT application No. PCT/US2021/042716, 5 pages.

* cited by examiner

ADJUSTABLE AIR SCOOP FOR LENS CLEANING

CROSS REFERENCE TO RELATED APPLICATIONS

This application claims the benefit of and priority to U.S. Provisional Patent Application No. 63/054,812, filed on Jul. 22, 2020, entitled Adjustable Air Scoop for Lens Cleaning, the entire disclosure of which is hereby incorporated herein by reference.

FIELD OF THE DISCLOSURE

This disclosure relates generally to devices and methods for cleaning lenses, and in particular, to devices and methods for cleaning lenses of imagers on vehicles.

BACKGROUND

Cameras or imagers may be disposed on exterior surfaces of vehicles to provide information both to drivers and to the vehicle itself. For example, imagers configured to capture a view of a scene to the rear of the vehicle may display the captured images on a display element within the vehicle to allow the driver to see what is behind the vehicle.

Some vehicle imagers may be disposed on arms extending from a surface of the vehicle. Due to precipitation, dirt, road salt, driving conditions, and other factors, the lenses or lens covers of cameras or imagers on the exterior of vehicles can become dirty or blocked so that the captured images are blurry or indistinct. In some cases, the lenses or lens covers may become so dirty or blocked that the imagers are unable to function as intended.

SUMMARY

According to an aspect, a system may comprise an imager having a lens; a housing supporting the imager and defining an inlet opening; a moveable vent cover configured to move between an open position and a closed position, and to at least partially cover the inlet opening when the moveable vent cover is in the closed position; a baffle; a channel having a first end and a second end, the channel defined by a portion of the housing and at least a portion of the baffle.

The system further may comprise a lens cover supported by the housing; the lens cover may be disposed to at least partially cover the lens. The system further may comprise a diverter extending from the housing and configured to direct fluid exiting from the second end of the channel toward the lens. The system further may comprise an actuator in communication with the moveable vent cover and configured to cause the moveable vent cover to move between the open position and the closed position. The system further may comprise a controller; the actuator may be in communication with the controller and the controller may be configured to cause the actuator to move the moveable vent cover. The controller may be in communication with at least one vehicle system. The controller may be configured to cause the actuator to move the moveable vent cover to the open position upon a determination that the vehicle speed may be greater than a first predetermined threshold. The controller may be configured to cause the actuator to move the moveable vent cover to the open position upon the receipt of an appropriate input from the at least one vehicle system. The controller may be configured to cause the actuator to move the moveable cover to the closed position upon a determination that the vehicle speed may be less than a second predetermined threshold. The actuator may be capable of moving the moveable vent cover to a partially open position between the open position and the closed position.

The controller may be configured to receive an input on the speed of the flow of air passing over at least a portion of the housing and to cause the actuator to move the moveable vent cover to the open position upon a determination that the speed of the flow of air passing over at least a portion of the housing is greater than a first predetermined speed. The controller may be configured to cause the actuator to move the moveable vent cover to the closed position upon a determination that the speed of the flow of air passing over at least a portion of the housing is less than a second predetermined speed.

The system further may comprise a filter configured to prevent solid materials from entering the channel. The housing may be disposed on an exterior surface of a vehicle. The system further may comprise a protruding member extending from the moveable vent cover, the protruding member configured to cause the moveable vent cover to move to one of the open position and a partially open position when there may be sufficient fluid flow into the protruding member. The system further may comprise a restraining mechanism configured to pull the moveable vent cover toward the closed position with a certain amount of force. The protruding member may be configured to cause the moveable vent cover to move to one of the open position and the partially open position only when there may be sufficient force in the protruding member from the fluid flow into the protruding member to overcome the force of the restraining mechanism.

According to another aspect, a system may comprise an arm having a housing, a first end, and a second end, the housing defining an inlet opening; a mounting plate secured to the first end of the arm; an imager having a lens, the imager and the lens both disposed within the housing at the second end of the arm; a moveable vent cover moveable between an open position and a closed position; a baffle interior to the housing and disposed in a spaced apart relationship with the moveable vent cover when the moveable vent cover may be in the closed position; a channel defined by a portion of the housing and the baffle, having a first end and a second end, and in fluid communication with the inlet opening; and a diverter configured to redirect a flow of fluid exiting the second end of the channel; wherein the channel is configured to, in cooperation with the diverter, selectively direct an incoming fluid from the inlet opening toward the lens. The baffle may be generally parallel to moveable vent cover when the moveable vent cover is in a closed position.

The moveable vent cover may be configured to at least partially cover the inlet opening when the moveable vent cover may be in the closed position. The system further may comprise a lens cover supported by the housing; the lens cover may be disposed to at least partially cover the lens. The diverter may extend from the housing. The system further may comprise an actuator in communication with the moveable vent cover and configured to move the moveable vent cover between the open position and the closed position. The system further may comprise a controller. The actuator may be in communication with the controller and may be configured to cause the actuator to move the moveable vent cover. The controller may be in communication with at least one vehicle system. The controller may be configured to cause the actuator to move the moveable vent cover to the open position upon the receipt of an appropriate input from the at least one vehicle system. The controller may be configured to cause the actuator to move the moveable vent cover to the open position upon a determination that the vehicle speed may be greater than a first predetermined threshold. The controller may be configured to cause the actuator to move the moveable cover from the open position to the closed position upon a determination that the vehicle speed may be less than a second predetermined threshold. The actuator may be capable of moving the moveable vent cover to a partially open position between the open position and the closed position. The controller may be configured to cause the actuator to move the moveable vent cover to the open position upon a determination that the speed of a flow of air passing over at least a portion of the housing may be greater than a first predetermined speed. The controller may be configured to cause the actuator to move the moveable vent cover to the closed position upon a determination that the speed of the flow of air passing over at least a portion of the housing may be less than a second predetermined speed. The system further may comprise a filter disposed so as to prevent solids from entering the channel. The mounting plate may be secured to an exterior surface of a vehicle.

According to another aspect, a system may comprise an imager having a lens; a housing supporting the imager and defining an inlet opening; a baffle; a channel having a first end and a second end, the channel defined by a portion of the housing and at least a portion of the baffle.

The system further may comprise a lens cover supported by the housing; the lens cover may be disposed to at least partially cover the lens. The system further may comprise a diverter extending from the housing and configured to direct fluid exiting from the second end of the channel toward the lens. The system further may comprise a filter configured to prevent solid materials from entering the channel. The housing may be disposed on an exterior surface of a vehicle.

According to another aspect, a method of cleaning a lens cover disposed on an exterior of a vehicle, may comprise moving a moveable vent cover disposed on a housing to an open position; allowing a fluid to flow through an opening defined in the housing and through a channel defined by the housing and a baffle disposed within the housing; and directing the fluid, by a diverter, toward the lens cover.

The method may further comprise receiving, by a controller, an appropriate input from a vehicle system. The method may further comprise causing, by the controller, an actuator to cause the moveable vent cover to move to the open position upon the receipt of the appropriate input from the at least one vehicle system. The method further may comprise determining whether the vehicle may be moving at a predetermined speed; and opening, upon a determination that the vehicle may be moving at the first predetermined speed the moveable vent cover. The method further may comprise determining, by a controller, that the speed of the vehicle may be greater than a first predetermined threshold; and causing, by the controller, an actuator to cause the moveable vent cover to move to the open position. The method further may comprise determining, by the controller, that the speed of the vehicle is less than a second predetermined threshold; and causing, by the controller, the actuator to cause the moveable vent cover to move to the closed position.

DETAILED DESCRIPTION

Figure 1:
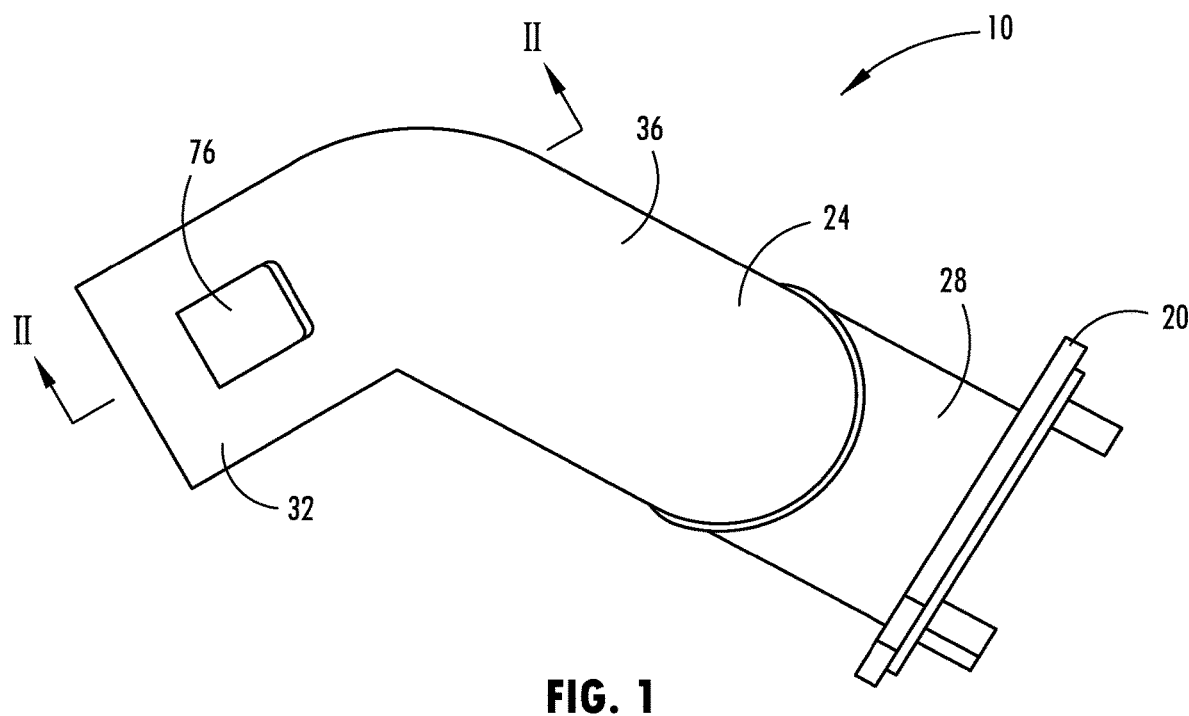
FIG. 1 illustrates a of a top view of a monitoring system having a moveable vent cover in accordance with this disclosure.

FIG. 1 illustrates a top view of a monitoring system 10. Monitoring system 10 may be disposed on an exterior surface of a vehicle (not shown). Monitoring system 10 may comprise a mounting plate 20 and an arm 24 extending from the mounting plate 20. Arm 24 may comprise a first end 28 and a second end 32. Mounting plate 20 may be secured to first end 28 of arm 24. The mounting plate 20 may be configured to be secured to a surface such as an exterior surface of the vehicle. The vehicle surface may comprise, for example, a side panel, a door panel, or a roof.

Figure 2:
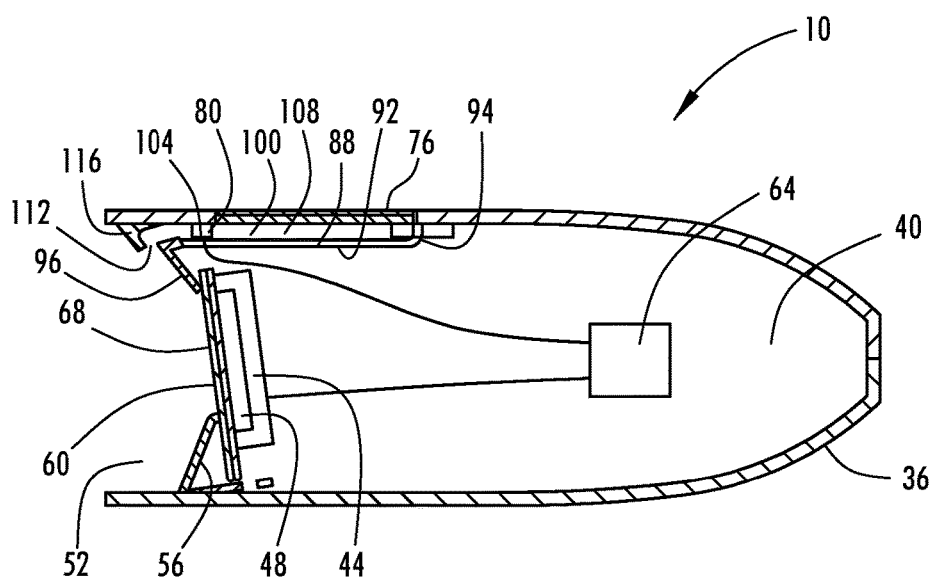
FIG. 2 illustrates a cutaway view along the line II-II of FIG. 1, showing the moveable vent cover in a closed position.
Figure 3:
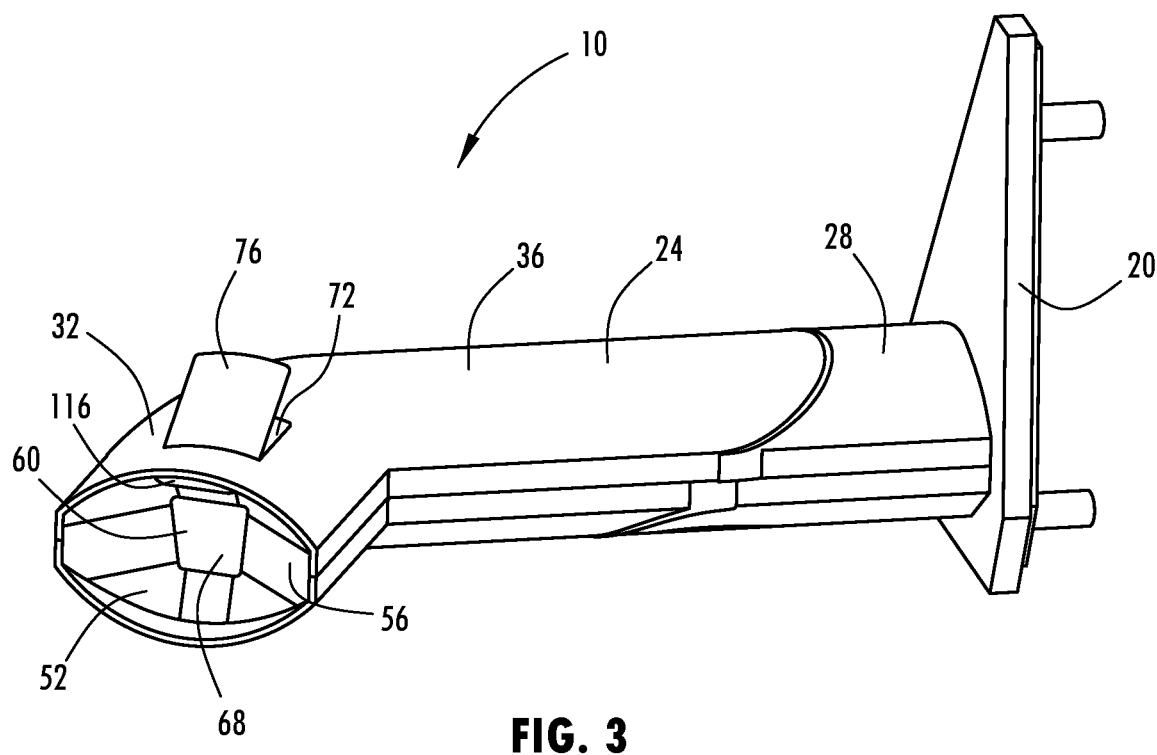
FIG. 3 illustrates a front perspective view of the monitoring system showing the moveable vent cover of FIG. 1 in an open position.

As shown in FIG. 2, arm 24 may comprise a housing 36 and housing 36 may define a cavity 40. A camera or other imager 44 having a lens 48 may be disposed within cavity 40. As shown in FIG. 3, housing 36 may further define a first opening 52 to cavity 40. At least one segment 56 may be disposed in first opening 52 and may partially occlude first opening 52. The at least one segment 56 may define a second opening 60.

Imager 44 may be configured to capture image data of a scene to the exterior of the vehicle. Imager 44 may be disposed in proximity to second end 32 of arm 24 and within cavity 40 of housing 36. Monitoring system 10 may be oriented such that lens 48 of imager 44 is positioned to capture a view toward the rear of the vehicle through second opening 60. Arm 24 may serve to hold imager 44 in a spaced apart relationship with a side of the vehicle, thereby allowing imager 44 to get a better view of the scene to the rear of the vehicle. Lens 48 of imager 44 may be disposed to at least partially align with second opening 60, thereby allowing lens 48 to capture image data through second opening 60. Data acquired by imager 44 may be relayed to a controller 64 for additional processing. Controller 64 may be in communication with a display element (not shown) disposed within the vehicle. Images generated from image data processed by controller 64 may be displayed on the display element.

In some embodiments, a lens cover 68 may be supported by housing 36. Lens cover 68 may be disposed to at least partially cover second opening 60 to cavity 40, and may extend between second opening 60 and lens 48 of imager 44. Lens cover 68 may comprise a transparent substrate. Lens cover 68 may be generally flat, or may be curved. In some embodiments, lens cover 68 may be configured to have a profile similar to the profile of the lens 48, and may be generally parallel to lens 48. Lens 48 may be disposed proximate to lens cover 68. In use, lens cover 68 may be exposed to conditions such as snow, rain, dirt, or dust. If precipitation, dirt, or dust become deposited on lens cover 68, imager 44 may not be able to properly capture images with the required clarity. This, in turn, may make it difficult or impossible for monitoring system 10 to function properly.

Figure 4:
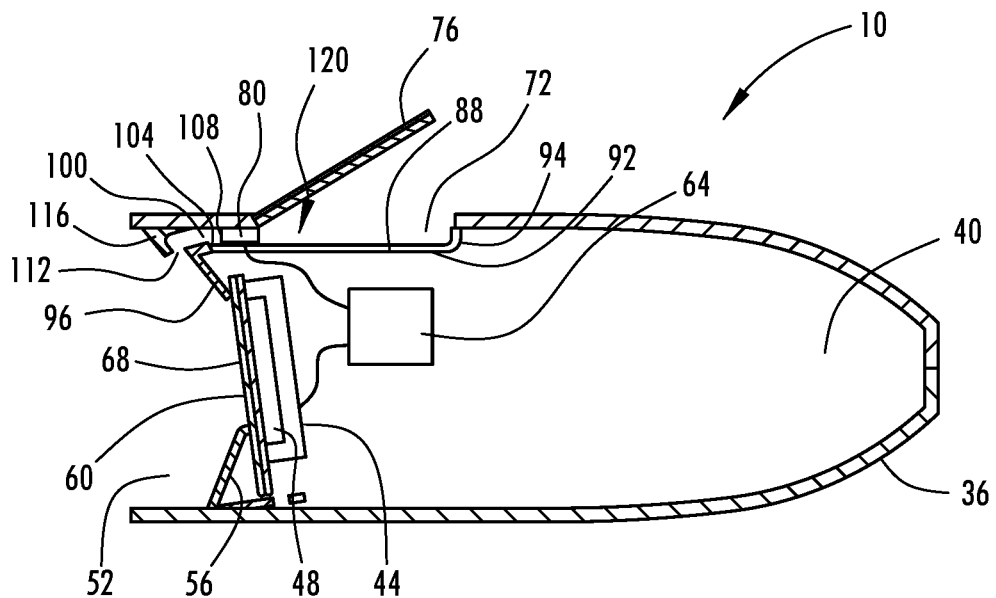
FIG. 4 illustrates a cutaway view along the line II-II of FIG. 1, showing the moveable vent cover in an open position.

Housing 36 may define an inlet opening 72. Inlet opening 72 may be disposed in proximity to second end 32 of arm 24. A moveable vent cover 76 may be disposed in or on and generally coplanar with housing 36. Moveable vent cover 76 may be configured to at least partially cover inlet opening 72. Moveable vent cover 76 may be operable to move between a first position and a second position. For example, moveable vent cover 76 may be operable to move between an open position as shown in FIGS. 3 and 4 and a closed position as shown in FIG. 2. In some embodiments, moveable vent cover 76 may be operable to move to a partially open position intermediate between the open position and the closed position.

In some embodiments, an actuator 80 may be disposed within or on housing 36 and in contact with moveable vent cover 76. Actuator 80 may be configured to cause moveable vent cover 76 to move from the first position to the second position. Actuator 80 may be in communication with controller and may receive inputs from controller directing actuator to cause moveable vent cover to move.

In some embodiments, controller 64 may be in communication with at least one vehicle system (not shown) such as the vehicle transmission, ignition, speed sensor or indicator or other sensor. For example, controller 64 may be in communication with a sensor (not shown) that indicates whether lens 48 or lens cover 68 is dirty. Controller 64 may be configured to, upon the receipt of an appropriate input from the at least one vehicle system, such as an input indicating that one of lens 48 and lens cover 68 is dirty, cause actuator 80 to move moveable vent cover 76 from the first position to the second position, for example, from the open position to the closed position. Controller 64 may further be configured to, upon the receipt of a second appropriate input from the at least one vehicle system, cause actuator 80 to move moveable vent cover 76 from the second position to one of a third position or back to the first position, for example, from a closed position to a partially open position or to a completely open position.

Controller 64 may be configured to cause actuator 80 to move moveable vent cover 76 based on, for example, the speed of the vehicle, a speed of fluid flow past at least a portion of housing 36, a combination of the speed of the vehicle and wind speed and direction, and/or the status of the vehicle ignition or transmission. For example, controller 64 may be configured to cause actuator 80 to move moveable vent cover 76 to an open position upon a determination that the vehicle speed is greater than a first predetermined threshold speed, and to cause actuator 80 to move moveable vent cover 76 to a closed position upon a determination that the vehicle speed is less than a second predetermined threshold speed. In a further example, controller 64 may cause actuator 80 to move moveable vent cover 76 to an open position upon receipt of an indication that the vehicle ignition has been turned on or an indication that the vehicle transmission has been placed into a driving condition. Conversely, controller 64 may cause actuator 80 to move moveable vent cover 76 to a closed position upon receipt of an indication that the vehicle ignition has been turned off or that the vehicle transmission has been placed into a parked condition. In yet a further example, controller 64 may be configured to receive an input on the speed of the flow of air passing over at least a portion of housing 36. Controller 64 may cause actuator 80 to move moveable vent cover 76 to an open position upon a determination that the speed of the flow of air passing over at least a portion of housing 36 is greater than a first predetermined speed and to cause actuator 80 to move moveable vent cover 76 to a closed position upon a determination that the speed of the flow of air passing over at least a portion of housing 36 is less than a second predetermined speed.

Figure 5:
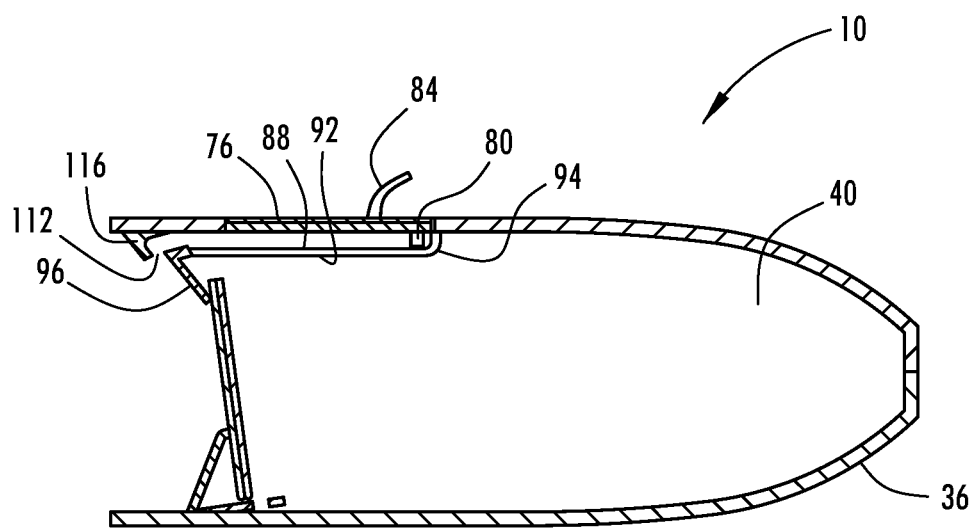
FIG. 5 illustrates a view of an embodiment pf the monitoring system of FIG. 1 having a protruding member on the moveable vent cover.

In some embodiments, as shown in FIG. 5, a protruding member 84 may extend from or be secured to moveable vent cover 76. Protruding member 84 may be configured to, when an airflow into protruding member 84 is sufficient, be moved from a first position to a second position by the force of the air. This movement, in turn, may cause moveable vent cover 76 to move to an open position. The airflow into protruding member 84 may be caused by vehicle speed, wind, or a combination of vehicle speed and wind. In some embodiments, a restraining mechanism such as, for example, a spring or an actuator 80, may be disposed to pull moveable vent cover 76 toward a closed position using a certain amount of force. In order to move to an open position, protruding member 84 on moveable vent cover 76 must experience sufficient force to overcome the opposing force from the restraining mechanism. In some embodiments, gravity may cause moveable vent cover 76 to close when the force upon protruding member 84 is not sufficient to keep moveable vent cover 76 in an open position.

Referring again to FIGS. 2 and 4, a baffle 88 may extend through a portion of cavity 40 defined by housing 36. In some embodiments, baffle 88 may have a generally planar portion 92. Baffle 88 may be secured to an interior surface of housing 36. Baffle 88 may be disposed in proximity to inlet opening 72. Baffle 88 may be at least coextensive with inlet opening 72 defined by housing 36. At least one side 94 of baffle 88 may be connected to housing 36, defining a channel 100 therebetween. In some embodiments, baffle 88 may be generally parallel to moveable vent cover 76 when moveable vent cover 76 is in a closed position.

Channel 100 may comprise a first end 108 and a second end 112, and may extend through a portion of cavity 40. First end 108 of channel 100 may be in fluid communication with inlet opening 72.

An angled panel 96 may extend from an end 104 of baffle 88. Angled panel 96 may extend from the end of generally planar portion 92 that is closest to second end 112 of channel 100. Angled panel 96 may be configured to extend between the end 104 of baffle 88 and lens cover 68. In some embodiments, angled panel 96 may contact lens cover 68.

A diverter 116 may extend from housing 36. In some embodiments, diverter 116 may extend from housing 36 a sufficient amount to partially define a portion of channel 100. Diverter 116 may be disposed in proximity to second end 32 of arm and may be configured to direct fluid flowing from second end 112 of channel 100 toward lens cover 68.

When vehicle is moving in a forward direction and moveable vent cover 76 is in an open or partially open position, moveable vent cover 76 may direct a fluid such as air into inlet opening 72. Fluid may flow into inlet opening 72 and from there into first end 108 of channel 100, pass through channel 100, and exit through second end 112 of channel 100. Upon exiting through second end 112 of channel 100, fluid may be redirected by diverter 116 toward lens cover 68. Fluid may contact lens cover 68 with sufficient force to cause precipitation, dust, or dirt that has been deposited on lens cover 68 to be blown away and removed from lens cover 68. When moveable vent cover 76 is in the closed position, little or no fluid may flow through channel 100.

In some embodiments, a user interface (not shown) may be provided, and may be in communication with controller 64. User interface may allow a user to manually override automatic positioning by controller 64. Upon the receipt of a particular user input at the user interface, actuator 80 may cause moveable vent cover 76 to move to one of an open or a closed position based on the user input.

In some embodiments, a filter 120 may be disposed within or in proximity to channel 100. In some embodiments, filter 120 may be configured to extend across at least a portion of a cross-section of channel 100 or across at least a portion of inlet opening 72. In some embodiments, filter 120 may be configured to extend between moveable vent cover 76 and inlet opening 72 when moveable vent cover 76 is in the open position. Filter 120 may be configured to prevent solid particles such as dust or dirt from entering channel 100 and impinging on lens cover 68 while allowing fluid to flow through channel 100.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

In this document, relational terms, such as first and second, top and bottom, front and back, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A system comprising:
    an arm having a first end, and a second end, the arm defining a housing, comprising an exterior and a cavity;
    a mounting plate secured to the first end of the arm;
    an inlet opening defined as a vent through the housing, between the exterior and the cavity on the side of the housing;
    a cavity opening defined on the housing and open to the cavity;
    a segment disposed within the cavity and at least partially occluding the cavity opening, the segment defining a lens opening and supporting a lens cover within the lens opening;
    an imager having a lens, the imager and the lens both disposed within the cavity of the housing and positioned within the cavity so as to be directed through the lens cover and outwardly through the cavity opening;
    a moveable vent cover moveable between an open position, wherein the moveable vent cover extends away from the housing on the exterior thereof, and a closed position, wherein the moveable vent cover is generally flush with an adjacent portion of the housing;
    a baffle interior to the housing and disposed in a spaced apart relationship with the moveable vent cover when the moveable vent cover is in the closed position;
    a channel defined by a portion of the housing and the baffle, having a first end and a second end, and in fluid communication with the inlet opening; and
    a diverter extending from the housing and configured to redirect a flow of fluid exiting the second end of the channel;
    wherein the channel is configured to, in cooperation with the diverter, selectively direct an incoming fluid directed into the inlet opening by the moveable vent cover in the open position toward the lens and over the lens cover on an exterior side of the segment; and
    wherein the moveable vent cover is configured to at least partially cover the inlet opening when the moveable vent cover is in the closed position.

2. The system of claim 1, wherein the lens cover is disposed to at least partially cover the lens.

3. The system of claim 1, further comprising an actuator in communication with the moveable vent cover and configured to move the moveable vent cover between the open position and the closed position.

4. The system of claim 3, further comprising a controller; wherein the actuator is in communication with the controller; and
    the controller is configured to cause the actuator to move the moveable vent cover by way of the actuator.

5. The system of claim 4, wherein the controller is in communication with at least one vehicle system; and
    wherein the controller is configured to cause the actuator to move the moveable vent cover to the open position upon a receipt of an appropriate input from the at least one vehicle system.

6. The system of claim 3, wherein the actuator is capable of moving the moveable vent cover to a partially open position between the open position and the closed position and maintaining the movable vent cover in the partially open position.

7. The system of claim 1, further comprising a filter disposed to prevent solids from entering the channel.

8. The system of claim 1, wherein the mounting plate is configured to be secured to an exterior surface of a vehicle.

9. The system of claim 1, wherein at least a portion of the segment comprises an angled panel extending between an end of the baffle adjacent the second end of the channel and a portion of the lens cover.

10. The system of claim 1, further including a protruding member extending from the moveable vent cover and configured to cause the moveable vent cover to move from the closed position to the opened position under force of air directed over the housing and contacting the protruding member.

11. The system of claim 10, further including a spring coupled between the moveable vent cover and the housing, the force of air directed over the housing and contacting the protruding member causing moving the moveable vent cover from the closed position to the open position under against a closing force of the spring.

* * * * *